United States Patent [19]

Marsh et al.

[11] Patent Number: 5,296,429
[45] Date of Patent: Mar. 22, 1994

[54] PREPARATION OF AN ELECTROCATALYTIC CATHODE FOR AN ALUMINUM-HYDROGEN PEROXIDE BATTERY

[75] Inventors: Catherine L. Marsh, Exeter, R.I.; Gerald L. Seebach, Lexington, Ky.; John W. Van Zee, Columbia, S.C.; Russell R. Bessette, Mattapoissett; Hubert G. Meunier, Holden, both of Mass.; Maria G. Medeiros, Bristol, R.I.

[73] Assignee: The United States of America as represented by the Secretary of the Navy, Washington, D.C.

[21] Appl. No.: 931,467

[22] Filed: Aug. 21, 1992

[51] Int. Cl.$^5$ .................. H01M 4/88; B05D 5/12; B01J 23/40
[52] U.S. Cl. ..................... 502/101; 427/115; 429/27; 502/326
[58] Field of Search ............... 502/101, 326; 427/115; 429/27

[56] References Cited

U.S. PATENT DOCUMENTS

| | | | |
|---|---|---|---|
| 3,110,622 | 11/1963 | Hipp | 427/115 |
| 3,116,165 | 12/1963 | Hipp | 502/101 |
| 3,276,976 | 10/1966 | Juliard | 429/40 |
| 3,615,862 | 10/1971 | Roth | 429/40 |
| 3,787,244 | 1/1974 | Schulmeister et al. | 427/115 |
| 4,587,001 | 5/1986 | Cairns et al. | 502/101 |
| 4,724,052 | 2/1988 | Hidola | 502/101 |

Primary Examiner—Paul E. Konopka
Attorney, Agent, or Firm—Michael J. McGowan; Prithvi C. Lall; Michael F. Oglo

[57] ABSTRACT

An electrocatalytic cathode that will allow hydrogen peroxide, $H_2O_2$, to behave electrochemically within an Al-$H_2O_2$ battery system is provided. The electrocatalytic cathode is comprised of nickel specially coated with one or a combination of the following six metals: platinum, ruthenium, rhodium, osmium, palladium, and iridium. The use of nickel coated with the appropriate combination of metals reduces the problems of excessive peroxide decomposition, thereby producing a battery that can operate efficiently by producing a high voltage at a high current density. The electrocatalytic cathode is produced by pretreating a nickel electrode with a hydrochloric acid bath and then by applying the metal coating by plating methods.

4 Claims, 2 Drawing Sheets

PREPARATION OF AN ELECTROCATALYTIC CATHODE FOR AN ALUMINUM-HYDROGEN PEROXIDE BATTERY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates to the production of electrodes and, more particularly, to electrocatalytic cathodes for use in aluminum hydrogen peroxide (Al-$H_2O_2$) batteries.

(2) Description of the Prior Art

Al-$H_2O_2$ batteries in the current art comprise an aluminum anode and an electrocatalyzed hydrogen peroxide cathode which react together to produce electrical energy. The electrocatalytic cathode is placed next to the aluminum anode and the electrolyte completes the internal circuit. Ideally, a quantity of electrons equivalent to that generated by the oxidation of the aluminum anode is consumed by the reduction of $H_2O_2$ at the electrocatalytic cathode. Limited power is produced in this reaction due to the inefficiency of the interaction of the $H_2O_2$ with the electrocatalytic cathode. Hydrogen peroxide, being relatively unstable, decomposes easily as a result of the heat, contaminants or other stimuli. The instability of hydrogen peroxide permits the decomposition of excessive quantities of peroxide; that is, the breakdown of $H_2O_2$ without electrochemical action, at the same time that the reduction, or electrochemical process, is taking place. Prior art electrocatalytic cathodes have been constructed of silver foil or plain nickel foil. Both of these foils cause a condition of either excessive peroxide decomposition or excessive overpotential. Either condition results in a reduction of net cell voltage as current density increases.

SUMMARY OF THE INVENTION

Accordingly, it is an object of the present invention to provide an electrocatalytic which will support a high cell voltage at both high and low current densities. It is a further object of the invention to provide an electrocatalytic cathode which will allow efficient electrochemical reduction of $H_2O_2$ contained in the electrolyte of the Al—$H_2O_2$ primary battery. It is yet another object of the present invention to provide efficient reduction while minimizing the decomposition of $H_2O_2$.

The invention is an electrocatalytic cathode comprised of a planar, reticulated nickel specially coated with one or a combination of the following six metals: platinum, ruthenium, rhodium, osmium, palladium, and iridium. Coating of the cathode is accomplished following pretreatment in a hydrochloric acid bath. Planar/reticulated, and porous nickel are available from commercial sources. Coatings can be applied using electroless, constant potential, or cyclic deposition techniques. The resulting battery operates efficiently at discharge rates up to 800 mAmp/$cm_2$.

BRIEF DESCRIPTION OF THE DRAWINGS

The foregoing objects and advantages of the present invention will become more readily apparent hereinafter in the specification when read with reference to the appended drawings wherein.

DESCRIPTION OF THE PREFERRED EMBODIMENTS

Figure 1:
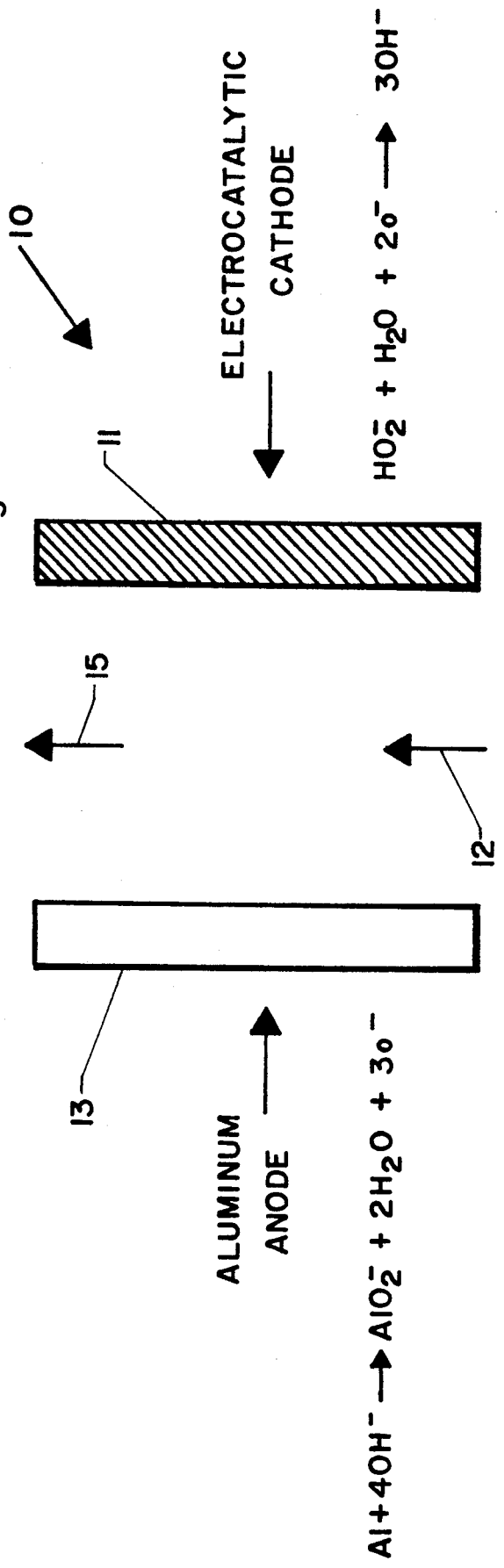
FIG. 1 is a schematic of Al—$H_2O_2$ single cell.

The electrocatalytic cathode 11 of the invention is depicted installed as an element of an Al—$H_2O_2$ battery, designated generally by the reference numeral 10, as shown in schematic in FIG. 1. A battery containing the new electrocatalytic cathode performs the usual electrochemical functions more efficiently than those using prior art cathodes. An electrolyte 12 allows transmission of the ions from the aluminum anode 13 to the electrocatalytic cathode 11. A quantity of electrons equivalent to that generated at the anode is consumed by the $H_2O_2$ at the electrocatalytic cathode to create the necessary energy. The new electrocatalytic cathode allows efficient peroxide reduction while minimizing the decomposition of $H_2O_2$ due to non-electrochemical processes.

The inlet to the battery admits electrolyte, a seawater solution providing NaOH and $H_2O_2$. The reactions occurring within the battery are as follows:

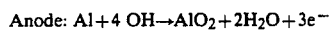

Anode: $Al + 4 OH^- \rightarrow AlO_2 + 2H_2O + 3e^-$

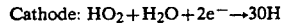

Cathode: $HO_2^- + H_2O + 2e^- \rightarrow 3OH^-$

The resulting outlet flow 15 is electrolyte and $AlO_2^-$. It is necessary to continually expel used electrolyte and replenish the battery with new electrolyte in order to eliminate contaminants and by-products released by the aluminum anode.

The combined effect of maintaining uncontaminated electrolyte and the specially designed cathode allow significant improvements in Al—$H_2O_2$ battery performance. The cathode is comprised of any of the last five of the first row transition metals, iron, cobalt, nickel, copper and zinc, although nickel is preferred, specially coated with one or a combination of the following six metals: platinum, ruthenium, rhodium, osmium, palladium, and iridium. The nickel is pretreated before it is coated with the metals. This pretreatment process consists of soaking the nickel in six (6) molar hydrochloric acid for fifteen minutes which is then followed by an extensive distilled water rinse. The nickel must be completely dry before it is coated with the metals. Once the nickel is pretreated, the chosen combination of metals can be applied using one of three methods: Electroless plating, constant potential deposition, or cyclic deposition. Electroless plating involves submerging the nickel in a bath containing the desired concentration of metal salts. The metals will plate without an applied current because of their favorable $E^o$ values relative to nickel. Constant potential deposition is accomplished by applying a constant voltage to the nickel which is submerged in a bath containing the desired metals. The amount of current passed is measured, and the deposition is stopped at a predetermined number of coulombs passed. Cyclic deposition involves subjecting the nickel to an oxidation-reduction process in the potential region known in the art to allow deposition of the desired metals. Again, the nickel is submerged in a bath containing the desired metals. Any of these methods will produce a coating which allows superior electrochemical reduction of the hydrogen peroxide. An activation step consisting of a cyclic process at an appropriate rate and between appropriate potentials may also enhance the activity of the coating formed by any of these methods.

Figure 2:
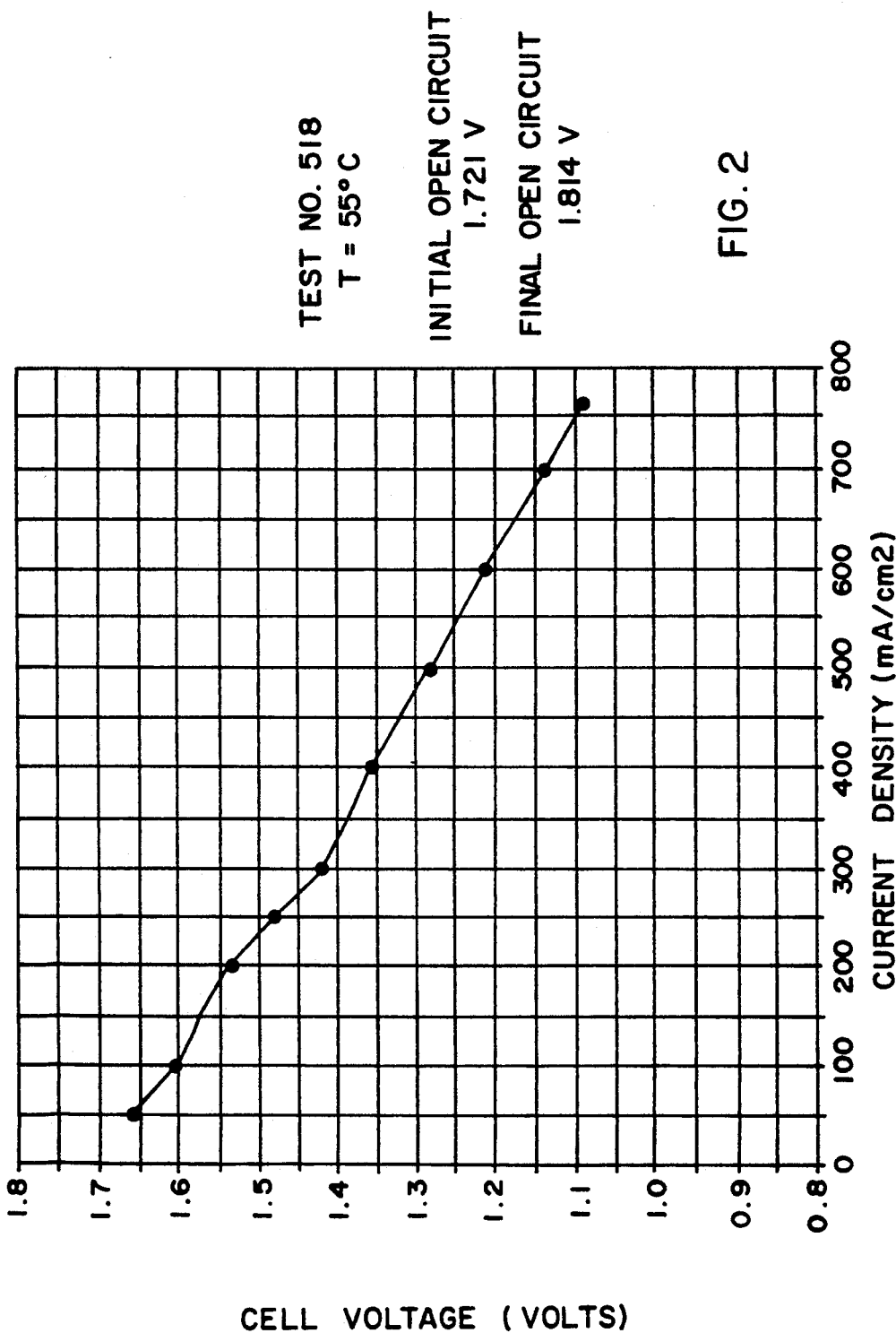
FIG. 2 is an Al—$H_2O_2$ Polarization Curve showing the correlation between a particular cell voltage and current densities.

The use of the nickel coated with the appropriate combination of metals reduces the problems of excessive peroxide decomposition, thereby producing a battery that can operate efficiently by producing a high voltage at a high current density. This new electrocatalytic cathode allows the battery to discharge efficiently at up to 800 mAmps/$cm^2$ as opposed to the prior batteries which did not discharge efficiently at high or low discharge rates. FIG. 2 shows the correlation between a particular cell voltage and current densities. Test results above 1.0 Volts indicate that the battery will perform at the necessary discharge rates.

The advantages of the present invention are numerous. An aluminum battery which uses this new electrocatalytic cathode will reduce peroxide decomposition while producing superior electrochemical reduction. Problems caused by excessive gas production are minimized.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for producing an electrocatalytic cathode for use in an aluminum-hydrogen peroxide battery comprising the steps of:
   providing a nickel electrode;
   pre-treating said electrode by soaking in 6 Molar hydrochloric acid;
   extensively rinsing said electrode with distilled water;
   completely drying said electrode; and
   coating said electrode with at least one metal selected from the group of metals including platinum, ruthenium, rhodium, osmium, palladium and iridium, to thereby form said electrocatalytic cathode which when used in an aluminum -hydrogen peroxide battery allows the battery to efficiently discharge up to 800 m Amp/$cm^2$.

2. A method for producing an electrocatalytic cathode as in claim 1 wherein said step of coating said electrode further comprises an electroless coating wherein said nickel electrode is suspended in a bath containing the desired concentration of metal salts.

3. A method for producing an electrocatalytic cathode as in claim 1 wherein said step of coating said electrode further suspending said electrode in a bath containing the desired concentration of metal salts and applying a constant potential.

4. A method for producing an electrocatalytic cathode as in claim 1 wherein said step of coating said electrode further suspending said electrode in a bath containing the desesired concentration of metal salts and applying potential to cause cyclic oxidation and reductin.

* * * * *